United States Patent [19]
Beck et al.

[11] Patent Number: 5,386,185
[45] Date of Patent: Jan. 31, 1995

[54] HIGH SPEED AC MOTOR CONTROLLER

[75] Inventors: Lawrence R. Beck, Girard; Joseph J. Franko, Niles; Daniel L. King, Warren, all of Ohio

[73] Assignee: General Motors Corporation, Detroit, Mich.

[21] Appl. No.: 62,859

[22] Filed: May 17, 1993

[51] Int. Cl.$^6$ ............................................. H02P 3/24
[52] U.S. Cl. ...................... 318/762; 318/759; 318/373; 318/375
[58] Field of Search ............... 318/362, 364, 373, 375, 318/376, 757, 758, 759, 760, 762

[56] References Cited

U.S. PATENT DOCUMENTS

| | | |
|---|---|---|
| 3,897,595 | 7/1975 | Fearno . |
| 4,195,255 | 3/1980 | Guttmann ........................ 318/762 |
| 4,305,030 | 12/1981 | Lorenz ............................ 318/758 |
| 4,334,181 | 6/1982 | Schroeder ....................... 318/762 |
| 4,450,397 | 5/1984 | Painter .......................... 318/762 |
| 4,857,818 | 8/1989 | Hobbs ............................ 318/762 |

*Primary Examiner*—Bentsu Ro
*Attorney, Agent, or Firm*—Anthony L. Simon

[57] ABSTRACT

An apparatus comprising, in combination, an AC motor, a solid state switch controlling the AC motor, the solid state switch switchable between an on state in which an electric current flows through the solid state switch and an off state in which electric current does not flow through the solid state switch, the solid state switch characterized by a turn off time such that, when the solid state switch is switched between the on state and the off state, at least a portion of the electric current flows through the solid state switch during the turn off time, a first switch circuit for switching off the solid state switch to prevent the electric current from flowing to the AC motor, a diode bridge coupled across the AC motor, a second switch circuit for controllably switching the diode bridge between an active state in which electric current may flow through the diode bridge and an inactive state in which electric current may not flow through the diode bridge, a control circuit for controlling the second switch circuit to switch the diode bridge into an active state a predetermined time period after the solid state switch is turned off, said predetermined time period longer than the turn off time of the solid state switch and shorter than an EMF degradation time, wherein back EMF of the AC motor is rectified into a DC current and injected back to the AC motor to provide high torque braking of the AC motor while avoiding a short circuit condition.

5 Claims, 5 Drawing Sheets

HIGH SPEED AC MOTOR CONTROLLER

This invention relates to a method and apparatus for controlling a high speed AC motor including high speed braking of the motor, and more particularly, for rectifying the back EMF of an AC motor into a DC current and using the DC current to brake the AC motor through DC current injection.

BACKGROUND OF THE INVENTION

In certain motor applications, the motor must start and stop quickly and repetitively. Such is the case in motors used to drive presses such as crimping presses. The motor must be started for each cycle and stopped at the end of the cycle. The longer the stopping time, the longer the time between cycles and the greater the number of revolutions of the motor required between cycles.

One known method for actively braking an AC motor is known as DC injection braking. In DC injection braking, a DC current is injected across the windings of the AC motor to create an electromagnetic force that acts on the motor rotor, forcing the rotor to stop rotating.

SUMMARY OF THE PRESENT INVENTION

This invention advantageously provides a motor control apparatus and method for controlling an AC motor that provides high speed braking of the motor. Advantageously, the method and apparatus of this invention provides motor control that allows fast repetitive starting and stopping of the motor, which in turn allows a decreased cycle time of the motor.

Advantageously, the method and apparatus of this invention provides an AC motor with DC injection braking without requiring an external DC power source. Advantageously, this invention takes advantage of back EMF of an AC motor for the short time that the back EMF is present after power is cut off from the motor. Advantageously, the method and apparatus of this invention utilizes the back EMF created by an AC motor to create a DC braking current for the motor and uses the DC braking current to stop the motor. Advantageously, the method and apparatus of this invention makes use of a narrow window of opportunity to utilize the back EMF of the AC motor to provide high speed braking of the motor.

Advantageously, the apparatus and method of this invention can brake a high speed one horse-power motor within one revolution. Advantageously, the method and apparatus of this invention can brake to a stop the high speed one-horse-power motor within 80 milliseconds.

Structurally, the apparatus of this invention comprises an AC motor controller providing power to an AC motor having an on state in which power is provided to the motor and an off state in which power is not provided to the motor. A rectifier control is coupled to the motor control and to a rectifier and, responsive to the motor control, provides a turn-on signal to the rectifier a predetermined time period after the motor is switched between the on state and the off state. The rectifier, responsive to the turn-on, rectifies back EMF of the motor, treating the motor as a generator and providing the rectified current to the motor in the manner to brake the motor with DC injection of the rectified current.

Advantageously, for an AC motor that is controllably switched between an on state and an off state by a solid state switch, the method of this invention comprises the steps of (a) commanding the solid state switch to an off state to switch off the motor, (b) pausing for a first predetermined time period representative of the turn-off time of the solid state switch, (c) switching on a rectifier after the first predetermined time period and before a second predetermined time period, representative of a degradation time of back EMF created by the AC motor, to rectify the back EMF current into a DC current, (d) applying the DC current to the motor to achieve DC injection braking of the motor, wherein the rectifier is not turned-on for the first predetermined time period to avoid a short circuit through the solid state switch and the rectifier and wherein the rectifier is turned on within the second predetermined time period so that sufficient back EMF is present to generate braking current for the motor.

A more detailed description of this invention is set forth below.

DETAILED DESCRIPTION OF THE INVENTION

Figure 1:
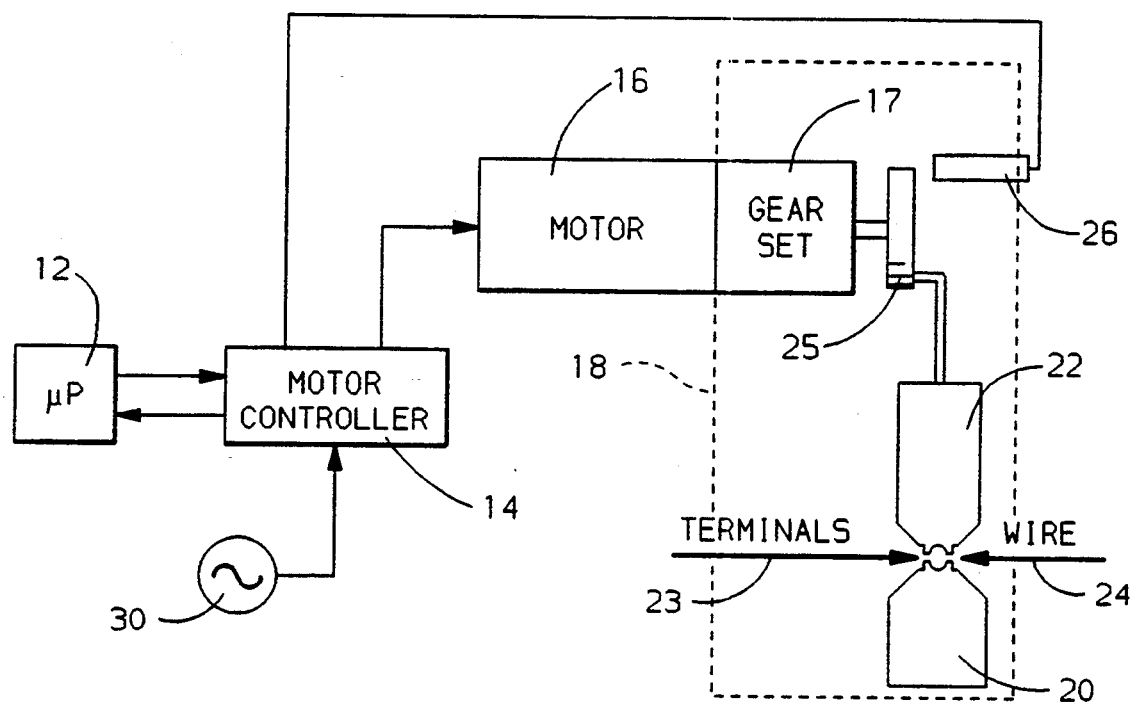
FIG. 1 is a schematic illustration of an implementation of this invention.

Referring to FIG. 1, an example implementation of this invention comprises microprocessor controller 12, motor controller 14, AC motor 16, reduction gear set 17 and crimping press 18. Crimping press 18 comprises crank 25 and crimping die 20 and 22. Press 18 is a standard tool press for crimping terminals 23 onto the ends of wires 24. Motor controlled tool presses, such as press 18 for crimping wires and terminals, are well known to those skilled in the art and need not be described in more detail herein.

AC motor 16 is a three-phase AC motor that drives the press 18 through a reduction gear set 17 and, for a crimping operation, is typically a one-horse-power motor. Microprocessor controller 12 (for example, a PLC control module) sends control signals to the motor controller 14, which controllably starts and stops motor 16 to run each crimping cycle. Proximity sensor 26 sends a signal to motor controller 14 once every revolution of gear set output crank 25. Microprocessor 12, motor 16 and proximity sensor 26 are of a type well known to those skilled in the art, for which more detail need not be given herein.

Figure 2:
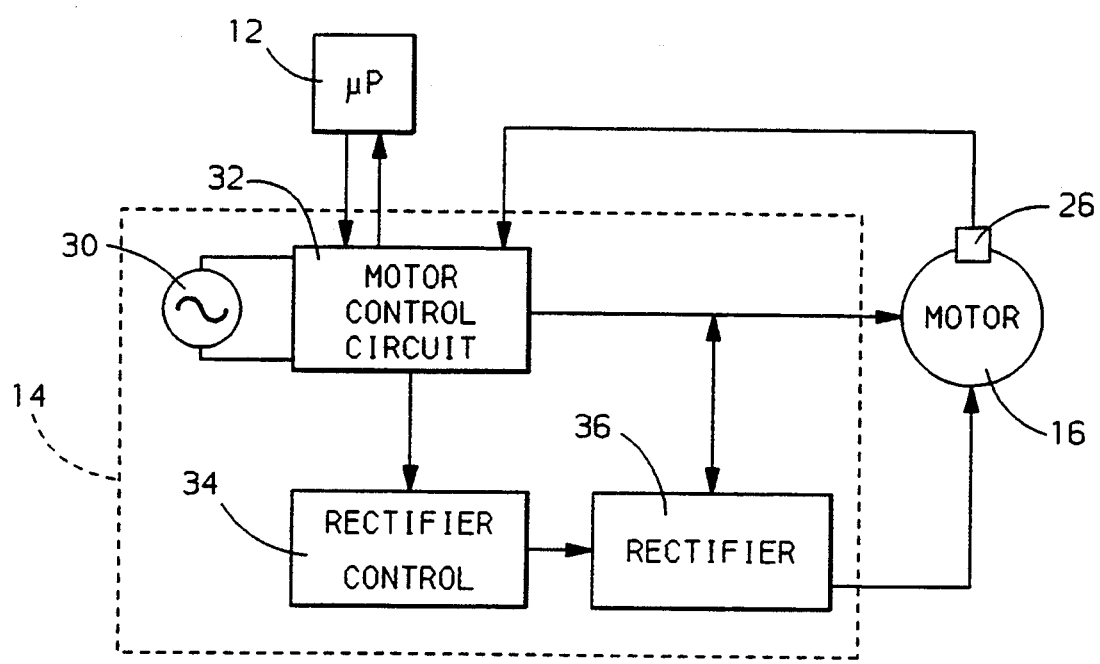
FIG. 2 illustrates schematically the apparatus of this invention.

Referring now to FIG. 2, the motor controller 14 comprises motor control circuit 32, receiving power from an AC power source 30 and responsive to commands from microprocessor 12 to selectively couple and decouple three-phase AC power to motor 16, which three-phase AC power drives motor 16. Rectifier control circuit 34 controls rectifier 36 to add high speed braking of motor 16 according to this invention.

When motor control circuit 32 receives a command from proximity sensor 26 to turn off motor 16, motor control circuit switches off a solid state switching device, decoupling AC power source 30 from motor 16. Rectifier control 34 monitors the switching off of the solid state switch and runs a timing circuit that times-out after a predetermined time period, generally in the range of 10–15 milliseconds, and switches on rectifier 36.

Rectifier 36 is a gated bridge rectifier that is coupled directly to the windings of the AC motor 16. When rectifier 36 is switched on in the predetermined time period after the turn off of the solid state switch, back EMF is still present across the windings of the AC motor. Rectifier 36 comprises a three phase diode bridge that rectifies the back EMF created by AC motor 16 and provides the rectified current as a DC current to motor 16. The DC current is provided to motor 16 as a DC injection current used to actively brake motor 16.

In accordance with the teachings of this invention, rectifier control 34 has tight timing constraints that must be followed if successful high speed braking is to occur. The timing constraints may be understood with reference to FIG. 3.

Figure 3:
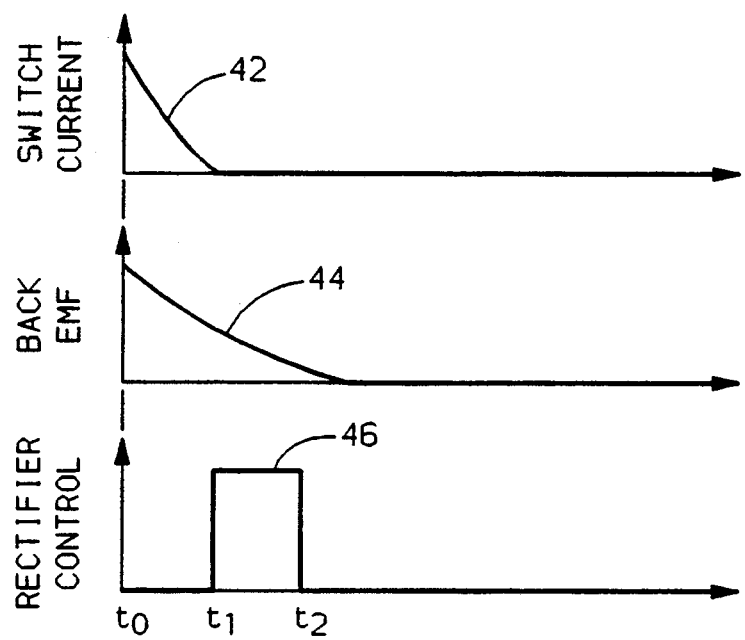
FIG. 3 is a timing diagram illustrating the operation of this invention.

Referring now to FIG. 3, line 42 represents the switch current of the solid state switching device controlling power flow from AC current source 30 to motor 16. Assuming that the switch device is turned off at time $t_0$, current still flows through the switching device for a brief time period, until approximately $t_1$, after the switching device is switched off. A typical time response is a 10 millisecond turn-off period. Trace 44 illustrates the back EMF created by motor 16. Assuming the motor is turned off at time $t_0$, the back EMF exponentially degrades with time. If rectifier bridge 36 is turned-on immediately at time $t_0$, while current still flowing through the switching device, a short circuit condition is created from the power supply through the switching device and the bridge rectifier. This short circuit condition will cause any fuse in the system to blow, or, if the system has no fuse, will very likely damage one or more of the system components. Thus, the rectifier control signal 46 cannot go high before the switch current 42 is substantially 0, which occurs at approximately time $t_1$.

As the back EMF degrades with the progression of time, there is less and less current to brake the motor. Thus, if the rectifier control is not switched on quick enough, fast response active braking of the motor cannot occur because of too little back EMF being generated by the motor to rectify into a DC injection current. The time it takes for the back EMF to degrade to zero, typically less than 100 ms, is referred to herein as the back EMF degradation time. While the back EMF may degrade over 80 or 100 ms, the useful back EMF for generating high torque braking current degrades as fast as 20 ms after power is cut off to the motor.

Figure 4A:
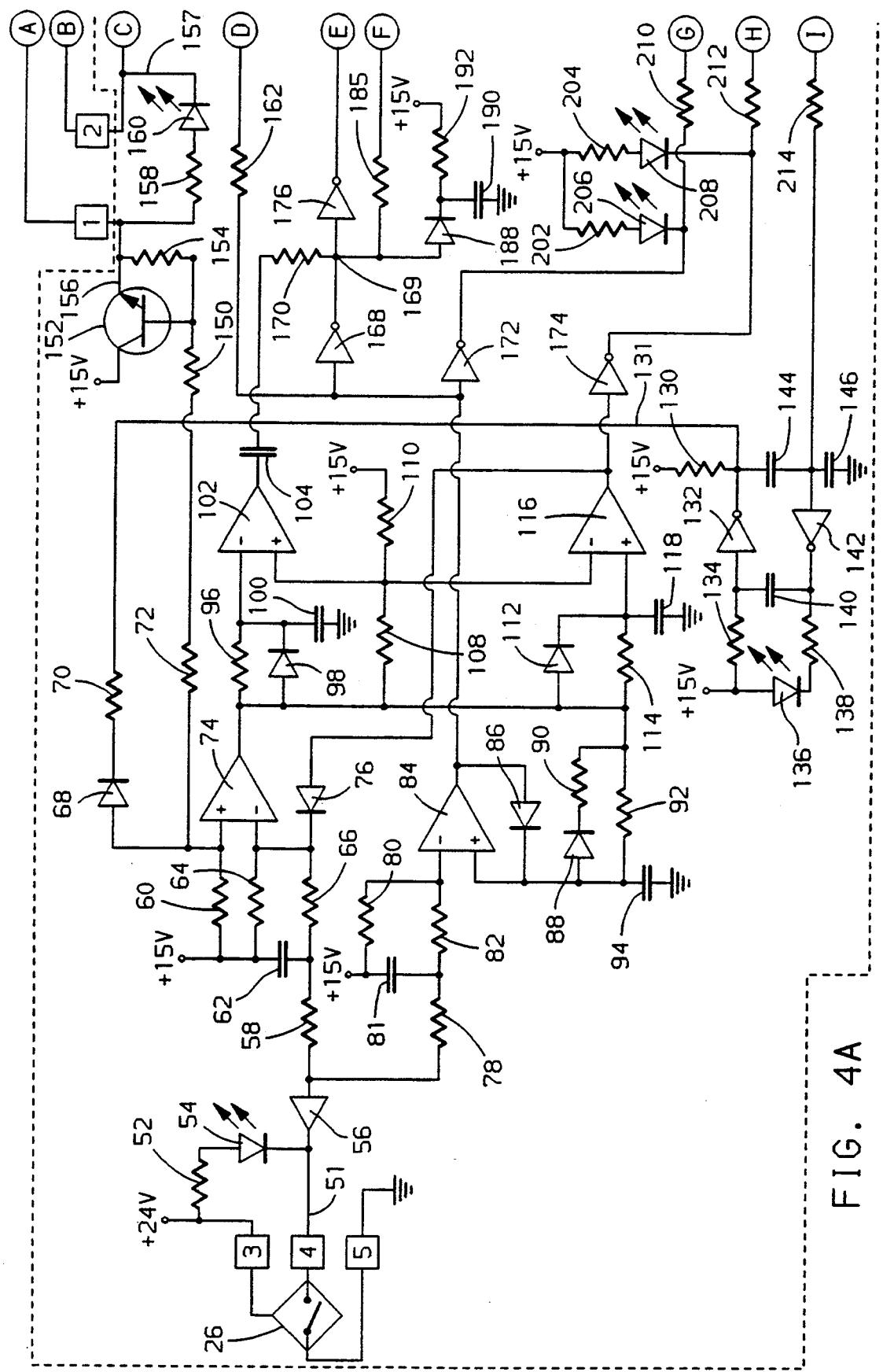
FIGS. 4a, 4b and 4c is a detailed circuit schematic illustration of this invention.
Figure 4B:
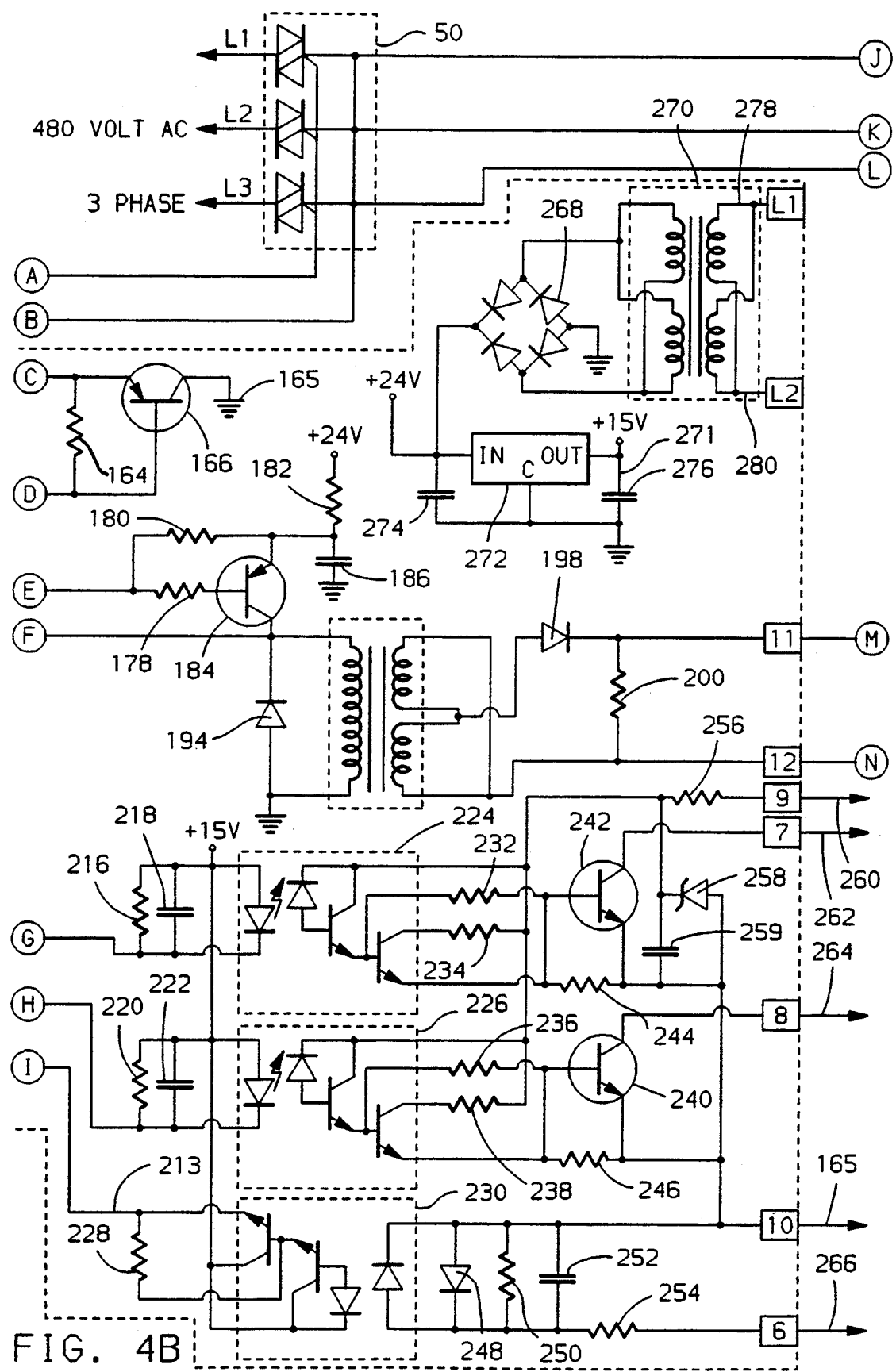
Figure 4C:
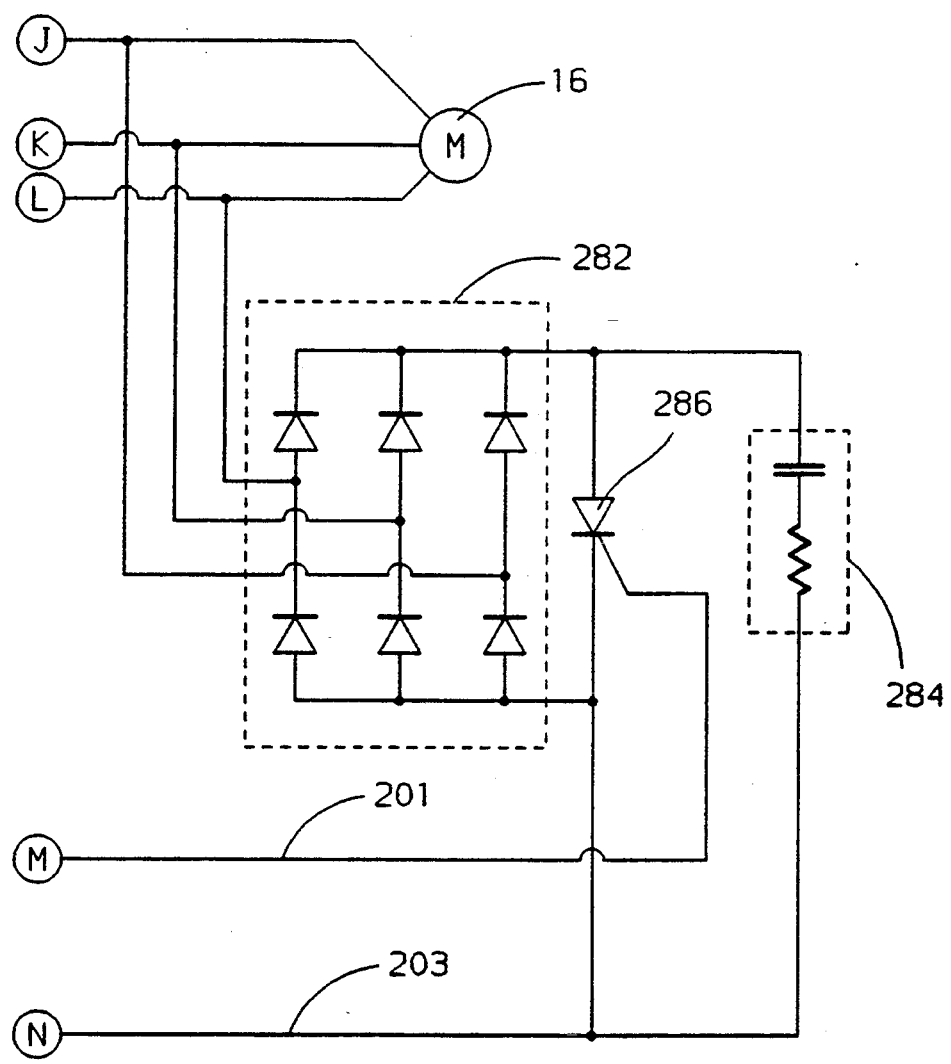

The time period between $t_1$ and $t_2$ illustrates the window of opportunity for actively braking motor 16 using the back EMF created by the motor. If the rectifier is not turned on until a time after $t_2$, active DC injection braking of the motor is minimal and the motor takes several revolutions to coast to a stop. Approximate times for $t_1$ and $t_2$, assuming that time $t_0=0$, are $t_1=10$ ms and $t_2=20$ ms Referring now to FIGS. 4a, 4b and 4c, a schematic diagram of the motor switching circuitry and the rectifier control circuitry is shown. Motor 16 is powered from a three-phase 480 volt AC power source of a known type, which is selectively coupled to the motor 16 via solid state relay 50. Solid state relay is a standard solid state switching device comprising three solid state switches, having gates coupled to lines 156 and 157, to selectively couple and decouple motor 16 from the 480 volt three phase AC power source. Lines 156 and 157 are controlled by transistors 152 and 166 in the manner described below.

Power for the circuit is provided by transformer 260, diode bridge rectifier 268 and voltage regulator 272. Power from a 120 volt AC power source is provided on lines 278 and 280 to transformer 270 and coupled from transformer 270 to rectifier 268, providing a 24 volt output voltage reference and supply. Capacitor 274 stabilizes the 24 volt output line. Fifteen volt regulator 272 provides a regulated 15 volt output on line 271 that is stabilized by capacitor 276, which attenuates high frequency components of the output. Note the ground reference in the circuit represents a circuit common, and not a true earth ground, which may introduce noise into the circuit.

To couple power to the motor 16, an input pulse is received across lines 165 and 266 from a microprocessor controlled PLC controller. The input pulse is filtered by the circuit of resistors 250 and 254 and capacitor 252 and is provided to optical isolator 230. Diode 248 protects optical isolator 230 from reverse voltage conditions.

In response to the input command, the optical isolator 230 outputs a signal on line 213, which is coupled to resistors 214 and 228. The signal on line 213 is coupled via resistor 214 to invertor 142, which inverts the signal and turns on status indicator LED 136 via resistor 138. Status indicator 136 indicates that the command has been provided to lines 165 and 266. Capacitors 144 and 146 stabilize and filter the signal and coupled the command signal via inverter 132 to line 131. Line 131 is normally held low by invertor 132. When the command is received to turn on the motor 16, resistor 130 is allowed to pull line 131 high, which high level signal is coupled via resistor 70, diode 68 and resistors 72, 150 and 154 to transistor 152.

Transistor 152 is coupled between the positive 15 volt supply and gate control line 156 of solid state relay 50. Transistor 152 is turned on responsive to the input command on lines 165 and 266. Transistor 166 is maintained on, responsive to the output of amplifier 84, which is controlled by the solid state proximity switch 26.

Proximity switch 26 is mounted on the output shaft of the gear reduction unit. The gear reduction unit is constructed in a known manner according to the following parameters. The motor is input to a 7:1 reduction gear set, which drives the press so that a complete cycle of press 18 is run with every 7 revolutions of the motor 16, or 1 revolution of the output shaft of the gear set.

Solid state proximity switch 26 is mounted proximate to the output shaft of the reduction gear set and normally provides a high output signal on line 51. When the output shaft of the reduction gear set passes bottom-dead-center, a gap in the output shaft passes proximity switch 26, which responsively pulls line 51 high. When line 51 goes high, current from the 24 volt supply line travels through resistor 52 and status LED 54, illuminating status LED 54 to indicate that the output shaft has reached bottom-dead-center position.

The signal from proximity switch 26 is coupled via diode 56 and resistors 78, 80 and 82 and capacitor 81 to the inverting input of amplifier 84. When the inverting input of amplifier 84 high, the output of amplifier 84 goes low, which low output signal is coupled via resistors 162 and 164 to transistor 166, turning off transistor 166 and turning off the solid state relay 150 via line 157.

Resistor 158 and LED 60 are connected to the gate control lines 156 and 157 of solid state relay 50 to provide a status indicator for the solid state relay 50. LED 160 turns on when the solid state relay 50 turns on and LED 160 turning off when the solid state relay 50 turns off.

When amplifier 74 goes, capacitor 94 is discharged via resistor 92. Capacitor 94 then starts recharging after the receipt of the command pulse on lines 165 and 266. If the proximity switch does not trip within 600 ms of the time that the command pulse is received on line 165 and 266, when capacitor 94 starts charging, amplifier 84 is forced on by capacitor 94, and latches itself on via diode 86. When amplifier 84 is latched on, a high signal is provided to inverter 168, which brings line 169 low. As line 169 is brought low, the output of inverter 176 goes high, bringing the base of transistor 184 high, latching off transistor 184. In this manner, if 600 ms passes and the machine has not cycled, an error is indicated. The error shuts down the circuit by latching transistor 184 off until either proximity switch 26 is forced to trip or until the circuit power is recycled.

The output of amplifier 84 is also coupled to invertor 172. The output of invertor 172 is coupled to LED 206, turning on LED 206, via resistor 202, when solid state relay 50 is commanded off. The signal is also coupled by resistors 210 and 216 and capacitor 218 to the input of optical isolator 224, which provides an output signal via resistors 232, 234 and 244, to transistor 242 providing the output signal between lines 260 and 262 (line 260 being the 24 volt reference and line 165 being the common reference). The output signal across lines 260 and 262 is illustrated as reference 306 in FIG. 5.

When the motor turns on, the signal between lines 260 and 262 is true for 600 milliseconds. If the 600 milliseconds expires and no braking has been commanded by the circuit, the PLC controller and the motor controller register an error signal, which may be used to signal an error, for example, on a panel lamp.

The output of proximity switch 26 is also coupled to amplifier 74, via resistors 58 and 60, capacitor 62 and resistors 60 and 64. When lines 51 goes high, amplifier 74 provides a low output signal that is coupled, via resistor 96, diode 98 and capacitor 100, to the inverting input of amplifier 102. The non-inverting input of amplifier 102 is biased by resistors 108 and 110. In response to the signal from amplifier 74, the output of amplifier 102 goes high. As the output of amplifier 102 goes high, line 169 is brought low via capacitor 104 and resistor 170. When line 169 goes low, invertor 176, resistors 178 and 180, transistor 184 and resistor 185, provide a pulse to pulse transformer 196, which is coupled with fly-back diode 194 for reverse voltage protection. Resistor 182 and capacitor 186 bias the emitter of transistor 184.

Responsive to the provided pulse, pulse transformer 196 provides an output pulse via diode 198 and resistor 200 to lines 201 and 203. Line 201 is connected to the gate of SCR 186 and line 203 is coupled via RC snubber 284, here acting as a noise filter, to the cathode of SCR 286. In response to the output of pulse transformer 196, SCR 286 activates, closing the circuit between its anode and cathode, thus, closing the circuit of three-phase diode bridge 282.

When SCR 286 activates, three phase diode bridge 282 is enabled to rectify the back EMF from the three-phase AC motor 16 into a DC current and provides that DC current back to motor 16 in the form of a DC injection current. Thus, the circuit utilizes the AC motor as a generator for the DC injection current. The DC injection current acts to quickly brake motor 16 with high torque, bringing motor 16 to a stop within 1 revolution.

When braking is commanded, the output signal from amplifier 74 is coupled via diode 112, resistor 114 and capacitor 118 to amplifier 116. Responsive to the braking command, amplifier 116 provides an output signal via invertor 174 and RC timing circuit comprising resistors 212 and 220 and capacitor 222 to optical isolator 226. Responsively, optical isolator 226 provides an output signal via resistors 236, 238 and 246 to transistor 240, providing an output signal on line 264 indicating that the system is in braking. The brake pulse is indicated as reference 308 in FIG. 5.

The circuit includes a double command protection as follows. If two on commands are provided on line 266 and 165 before the system completely cycles, the second command is simply ignored by amplifier 74.

Figure 5:
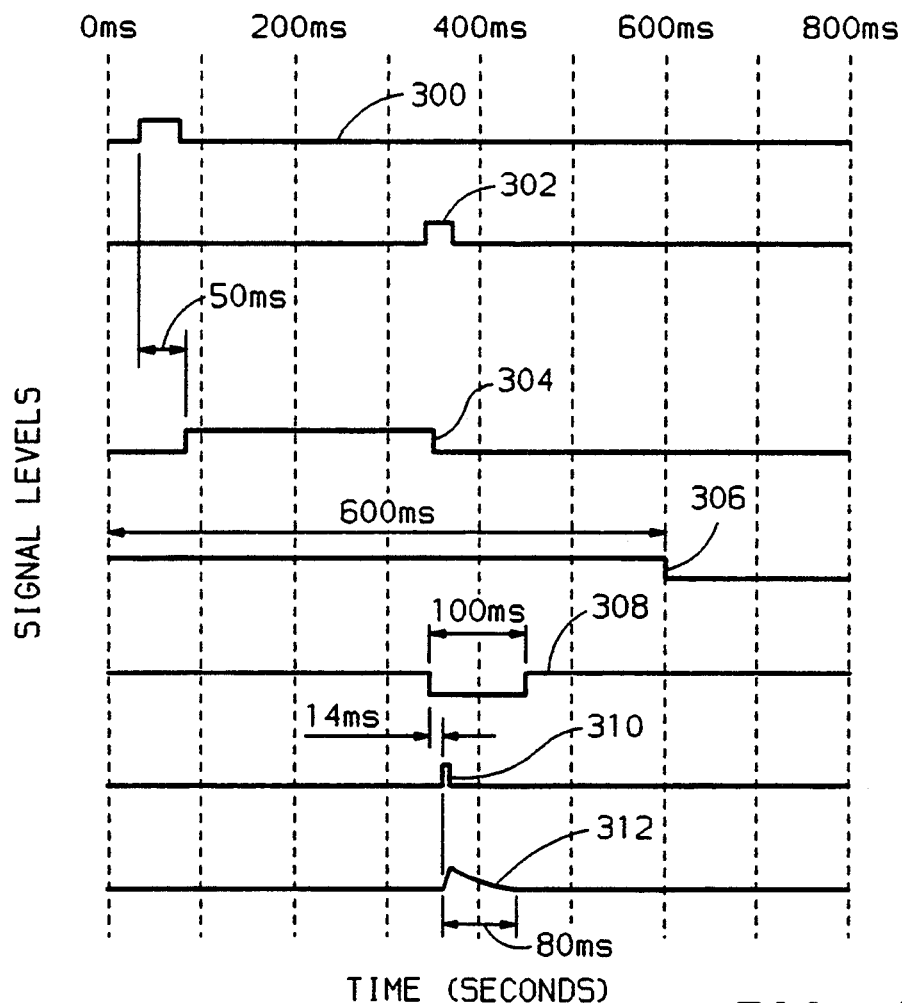
FIG. 5 is a timing diagram for the circuit of FIGS. 4a, 4b and 4c.

Referring to FIG. 5, reference 300 represents the input command applied at time $t_0$. Reference 302 represents the proximity switch output on line 51, which goes high after one complete cycle of the stamping process corresponding, in this example, to 7 revolutions of the motor. The typical time period between the on input command and the proximity switch pulse is approximately 300 milliseconds. Approximately 50 milliseconds after the input command on line 266, solid state relay 50 is turned on, as illustrated by reference 304, and stays on until proximity switch 26 pulses, turning off solid state relay 50 via transistor 166. Reference 306 is the fault signal referred to above.

Reference 308 represents the output signal on line 264 indicating that the proximity switch has tripped the braking signal. When reference 308 goes low before the reference signal 306 goes low, the PLC controller knows that the system is operating correctly. Approximately 14 milliseconds after solid state relay turns off, the trigger pulse across lines 201 and 203 is provided to SCR 286, as shown by reference 310. The trigger pulse turns on SCR 286, which then stays on as long as current is flowing through the three-phase diode bridge 382. The current through the diode bridge quickly rises, as indicated by reference 312, and then begins to decay as the back EMF degrades and as the motor is quickly braked by the DC injection of the rectified back EMF from motor 16.

The above described apparatus of this invention, including the AC motor that is controllably switched between an on state and an off state by the solid state switch, implements the steps of this invention in the above described manner. More particularly, the method of this invention comprises the steps of (a) commanding the solid state switch to an off state to switch off the motor, (b) pausing for at least a first predetermined time period representative of the turn-off time of the solid state switch, (c) switching on a rectifier after the first predetermined time period passes and before a second predetermined time period, representative of a degradation time of back EMF created by the AC motor, passes, to rectify the back EMF current into a DC current, (d) applying the DC current to the motor to achieve DC injection braking of the motor, wherein the rectifier is not turned-on for the first predetermined time period to avoid a short circuit through the solid state switch and the rectifier and wherein the rectifier is turned on within the second predetermined time period so that sufficient back EMF is present to generate braking current for the motor.

In the above-described manner, the apparatus of this invention provides a highly responsive AC motor controller that can stop an AC motor by rectifying the AC motor's back EMF into a DC current that is injected into the motor for DC injection braking of the motor without requiring an external DC power source. Thus, this invention provides an economic way to achieve quick stopping control of an AC motor utilizing a circuit that can be implemented onto a single circuit board.

The above-described implementation of this invention is an example implementation for use in an electric motor powered press of which it is desired to stop the AC motor quickly after the press has completed the cycle. The above-described implementation is an example implementation. Moreover, various other improvements and modifications to this invention may occur to those skilled in the art and such improvements and modifications will fall within the scope of this invention as set forth below.

The embodiments of the invention in which an exclusive property or privilege is claimed are defined as follows:

1. In combination:
   a. an AC motor;
   b. a solid state switch controlling the AC motor, the solid state switch switchable between an on state in which an electric current flows through the solid state switch and an off state in which the electric current does not flow through the solid state switch, the solid state switch characterized by a turn off time period such that, when the solid state switch is switched between the on state and the off state, at least a portion of the electric current flows through the solid state switch during the turn off time period;
   c. means for switching off the solid state switch to prevent the electric current from flowing to the AC motor;
   d. a diode bridge coupled across the AC motor;
   e. switch means for controllably switching the diode bridge between an active state in which the electric current may flow through the diode bridge and an inactive state in which the electric current may not flow through the diode bridge;
   f. control means for controlling the switch means to switch the diode bridge into an active state a predetermined time period after the solid state switch is turned off, said predetermined time period longer than the turn off time period of the solid state switch and shorter than an EMF degradation time period, wherein back EMF of the AC motor is rectified into a DC current and injected back to the AC motor to provide high torque braking of the AC motor while avoiding a short circuit condition.

2. The apparatus of claim 1, wherein the turn-off time period is substantially equal to 10 ms.

3. The apparatus of claim 2, wherein the predetermined time period is greater than 10 ms and less than 20 ms.

4. The apparatus of claim 2, wherein the degradation time period is less than 100 ms.

5. For an AC motor that is controllably switched between an on state and an off state by a controllable solid state switch also having an on state and an off state, a method comprising the steps of:
   (a) commanding the solid state switch to an off state to switch off the motor;
   (b) pausing for a first predetermined time period representative of a turn-off time of the solid state switch;
   (c) switching on a rectifier after the first predetermined time period and before a second predetermined time period representative of a degradation time of a back EMF current generated by the AC motor, wherein the rectifier rectifies the back EMF current into a DC current;
   (d) applying the DC current to the motor to achieve DC injection braking of the motor, wherein the rectifier is not turned-on for the first predetermined time period to avoid a short circuit condition through the solid state switch and the rectifier and wherein the rectifier is turned on within the second predetermined time period so that sufficient back EMF is present to generate braking current for the motor.

* * * * *